UNITED STATES PATENT OFFICE.

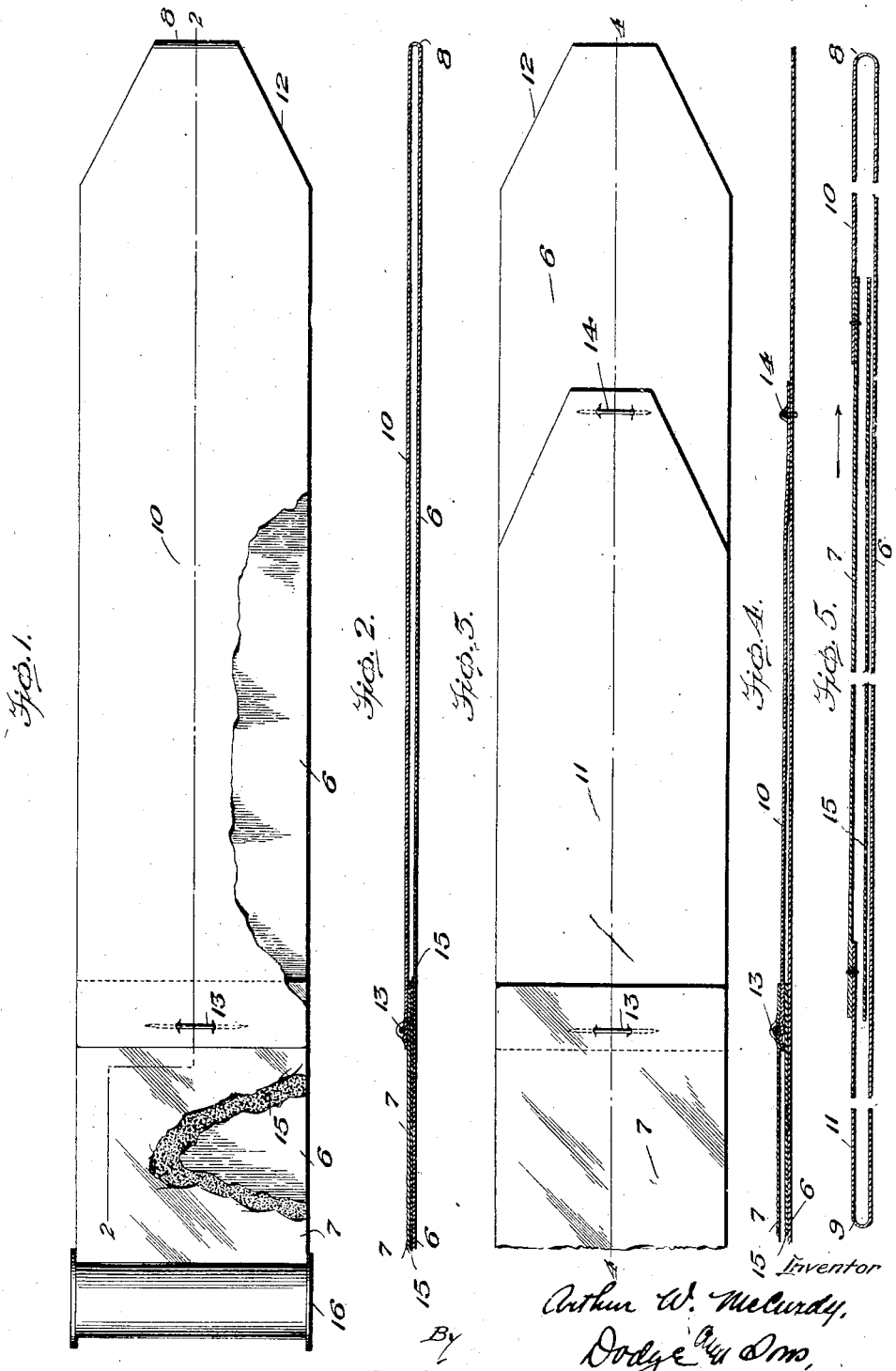

ARTHUR W. McCURDY, OF VICTORIA, BRITISH COLUMBIA, CANADA.

FILM-CARTRIDGE.

1,347,109.  Specification of Letters Patent.  Patented July 20, 1920.

Application filed April 26, 1917, Serial No. 164,693. Renewed November 18, 1919. Serial No. 338,807.

*To all whom it may concern:*

Be it known that I, ARTHUR W. MCCURDY, a subject of the King of England, residing at Victoria, British Columbia, Dominion of Canada, have invented certain new and useful Improvements in Film-Cartridges, of which the following is a specification.

This invention relates to photography and particularly to roll films.

The invention provides a roll film cartridge including a "stencil strip" for exposure titling or identification. Such "stencil strips" usually impress their legends upon the film by a photographic action, but mechanical impression has been proposed and practised, and my invention is available with any type of stencil strip placed between the film and the protecting strip regardless of its characteristic mode of action.

In a co-pending application, Serial No. 92,004, filed April 18, 1916 I describe and claim a film cartridge having extension strips at the forward end or at both ends. The film of the present application is an improvement upon that, the special features of improvement being in the connecting means used between strips and the mode of mounting the stencil strip.

Preferred embodiments of the invention are illustrated in the accompanying drawings, in which:—

Figure 1 is a view of the cartridge with the forward portion of the protecting strip and the forward extension strip unrolled to expose the film strip. Parts are broken away to show the stencil and protecting strips;

Fig. 2 is a section on the line 2—2 of Fig. 1;

Fig. 3 is a somewhat similar view of a modified construction, the rear ends of this film, and protecting strip and the rear extension strip being shown in this figure;

Fig. 4 is a section on the line 4—4 of Fig. 3; and

Fig. 5 is a longitudinal section of the complete film, protecting and extension strips, constructed and assembled in the manner shown in Figs. 1 and 2. Parts are broken out to reduce the length and the view is largely diagrammatic to illustrate the freedom of the stencil strip and the reversed lap of film and extension strip at the two ends.

Referring first to Figs. 1, 2 and 5, 6 represents the backing strip, commonly of translucent red paper. This strip is of the same width as the film strip 7 and is folded back near its ends at 8 and 9 forming extension strips 10 and 11 (Fig. 5). The material is tapered at the fold, as shown at 12 (Fig. 1) and the extremity of each folded back portion overlaps and is fastened to the corresponding end of the film strip 7 by means of a pointed headless pin 13 quilted through from the back as clearly shown in Figs. 1 and 2. This is the preferred means of attachment and it is rendered feasible by the fact that in a film constructed with extension strips the pin is so covered by the backing strip as never to touch the face of the sensitized film. Other means of attachment may be used.

In order to insure smooth passage over the small guide rollers of a camera the directions of overlap of the ends of the extension strips and film are reversed at the two ends of the cartridge. At the forward end of the roll (with reference to the direction of movement of the film through the camera) the extension strip 10 overlies the face of the film. (See Figs. 1 and 2.) At the rear end, the film strip overlies the extension strip 11. These two joints are correctly differentiated in Fig. 5 in which the forward end is to the right as indicated by the arrow. The distinction is also presented between Fig. 1 which represents a front end and Fig. 3 which represents a rear end (not, however, of the same film).

The purpose of the extension strips 10 and 11 is to allow a creep of the film over the protecting strip to occur, and to extend past the end of the film so that there will be no bunching in the camera or developing machine. To secure this result the extension strips need not extend clear to the end of the protecting strip but may stop short of the end of the protecting strip as indicated in Figs. 3 and 4. Here a pin 14, similar to pin 13, is used. At the forward end of the film this pin 14 should be so near the end of the protecting strip as to be beyond all the guide rolls when the film is initially threaded into the camera. If this cannot be done the pin is omitted and recourse is had to adhesive connection as otherwise there is danger of catching and tearing of the end of the extension strip.

With any of the arrangements above described I may make use of a stencil strip 15 which preferably is of the same width as the film strip and which is laid in between the film and protecting strip but is connected to neither. The stencil strip 15 is practically coextensive with the film strip.

The films constructed as above are wound upon the usual flanged spool 16, the forward end of the protecting strip being exposed at the periphery of the roll to serve in threading up a camera in daylight.

A film prepared as above has various advantages. It rolls smoothly in a camera and when wound into the apron of a developing tank accommodates itself to the reversed direction of flexure. More important, however, is economy in manufacture. The film does not require to be rolled and then re-rolled in the reverse direction, as is the present practice. This saves labor and possible injury to the film. There is no use of adhesives or moisture on or near the film. The stencil strip is easily put into position and will roll smoothly under all conditions. In case of hand development it can be removed with the least possible difficulty and handling, an important point when it is considered that the stencil strip is a waxy carbon tissue in the present commercial type of "autographic" cartridge.

The pin fastening is a valuable feature because it brings no moisture into the cartridge as to adhesives, and does not cause a stiff place in the strips at the points of juncture as do the gummed stickers now in common use. The pin also gives a slight lateral flexibility to the connected strips which is favorable to smooth entrance between the spool flanges. The pin may be of metal or of any other suitable material.

Having thus described my invention what I claim is:—

1. A film cartridge comprising in combination a strip of film; a protecting strip longer than said film strip; an extension strip of substantial length connected to said protecting strip, a fastener connecting one end of said film strip to said extension strip; and a spool on which said film and strips are wound together.

2. A film cartridge comprising in combination a strip of film; a protecting strip longer than said film strip; an extension strip of substantial length connected to said protecting strip; a pin quilted through the end of said film strip and said extension strip to connect the two together; and a spool on which said film and strips are wound together.

3. A film cartridge comprising in combination a strip of film; a protecting strip longer than said film strip; an extension strip of substantial length connected to said protecting strip; a pin connecting one end of said film strip to said extension strip; a stencil strip placed between said film strip and said protecting strip and retained solely by its frictional engagement therewith; and a spool on which said film and strips are wound together.

4. A film cartridge comprising in combination a strip of film; a protecting strip longer than said film strip; an extension strip of substantial length connected to said protecting strip; a fastener quilted through the end of said film strip and said extension strip to connect the two together; a stencil strip placed between said film strip and said protecting strip and retained solely by its frictional engagement therewith; and a spool on which said film and strips are wound together.

5. A film cartridge comprising in combination a strip of film; a protecting strip longer than said film strip and projecting beyond both ends thereof; extension strips of substantial length connected to said protecting strip; pins connecting the ends of said film strip to corresponding extension strips; and a spool on which said film and strips are wound together.

6. A film cartridge comprising in combination a strip of film; a protecting strip longer than said film strip and projecting beyond both ends thereof; extension strips of substantial length connected to said protecting strip; fasteners quilted through the ends of said film strip and corresponding extension strips to connect the ends of the film strip to the extension strips; and a spool on which said film and strips are wound together.

7. A film cartridge comprising in combination a strip of film; a protecting strip longer than said film strip and projecting beyond both ends thereof; extension strips of substantial length connected to said protecting strip; pins connecting the ends of said film strip to corresponding extension strips; a stencil strip placed between said film strip and said protecting strip and retained solely by its frictional engagement therewith; and a spool on which said film and strips are wound together.

8. A film cartridge comprising in combination a strip of film; a protecting strip longer than said film strip and projecting beyond both ends thereof; extension strips of substantial length connected to said protecting strip; fasteners quilted through the ends of said film strip and corresponding extension strips to connect the ends of the film strip to the extension strips; a stencil strip placed between said film strip and said protecting strip and retained solely by its frictional engagement therewith; and a spool on which said film and strips are wound together.

9. A film cartridge comprising in combination a strip of film; a protecting strip longer than said film strip and projecting beyond both ends thereof; extension strips of substantial length connected to said protecting strip; the rear end of the forward extension strip overlapping the face of the forward end of the film and the rear end of the film overlapping the face of the forward end of the rear extension strip; fasteners extending transversely to said strips and quilted through the overlapping ends thereof; and a spool upon which said strips are wound together.

In testimony whereof I have signed my name to this specification.

ARTHUR W. McCURDY.